US012746423B2

(12) United States Patent
Kochelek et al.

(10) Patent No.: US 12,746,423 B2
(45) Date of Patent: Sep. 29, 2026

(54) NOZZLE PLUGS FOR A DELUGE FIRE PROTECTION SYSTEM

(71) Applicant: Engineered Corrosion Solutions, LLC, St. Louis, MO (US)

(72) Inventors: Jeffrey T. Kochelek, Creve Coeur, MO (US); Adam H. Hilton, Chesterfield, MO (US); Andrew K. Loeffelman, High Ridge, MO (US)

(73) Assignee: ENGINEERED CORROSION SOLUTIONS, LLP, St. Louis, MO (US)

( * ) Notice: Subject to any disclaimer, the term of this patent is extended or adjusted under 35 U.S.C. 154(b) by 376 days.

(21) Appl. No.: 18/042,111

(22) PCT Filed: Aug. 20, 2021

(86) PCT No.: PCT/US2021/046837

§ 371 (c)(1),
(2) Date: Feb. 17, 2023

(87) PCT Pub. No.: WO2022/040498

PCT Pub. Date: Feb. 24, 2022

(65) Prior Publication Data

US 2023/0241439 A1 Aug. 3, 2023

Related U.S. Application Data

(60) Provisional application No. 63/068,574, filed on Aug. 21, 2020.

(51) Int. Cl.

| | |
|---|---|
| ***A62C 35/68*** | (2006.01) |
| ***A62C 35/62*** | (2006.01) |
| ***B05B 15/14*** | (2018.01) |

(52) U.S. Cl.

CPC .............. *A62C 35/68* (2013.01); *A62C 35/62* (2013.01); *B05B 15/14* (2018.02)

(58) Field of Classification Search

CPC .......... A62C 35/68; A62C 35/62; B05B 15/14

(Continued)

(56) References Cited

U.S. PATENT DOCUMENTS

| | | | | |
|---|---|---|---|---|
| RE29,155 E * | 3/1977 | Mears | A62C 35/605 137/457 |
| 4,109,727 A | 8/1978 | Job | |

(Continued)

FOREIGN PATENT DOCUMENTS

| | | | |
|---|---|---|---|
| GB | 314397 | A | 5/1930 |
| KR | 1020020091137 | A | 12/2002 |
| KR | 100493522 | B1 | 5/2005 |

OTHER PUBLICATIONS

European Search Report dated Nov. 30, 2023, issued in corresponding European application.

*Primary Examiner* — Christopher S Kim
(74) *Attorney, Agent, or Firm* — Husch Blackwell LLP

(57) ABSTRACT

A nozzle plug for a deluge fire protection system having nozzles connected with a pipe network, the nozzles having a pipe connection with a nozzle chamber and a nozzle orifice allowing for the flow of water toward a deflector for dispersal, includes a plug body configured to fit within the nozzle chamber and/or nozzle orifice and form a seal of the nozzle orifice; a deformable component connected with the plug body configured to retain the seal of the nozzle orifice up to a predetermined pressure level above atmospheric pressure within the pipe network and to deform when a current pressure with the pipe network exceeds the predetermined pressure level and release the seal of the nozzle orifice to allow for the flow of water through the nozzle (Continued)

orifice; and wherein the deformable component is configurable to calibrate a deformation point corresponding to the predetermined pressure level.

9 Claims, 6 Drawing Sheets

(58) Field of Classification Search
USPC ............................ 169/17, 58, 20, 37, 90, 41
See application file for complete search history.

(56) References Cited

U.S. PATENT DOCUMENTS

| | | | |
|---|---|---|---|
| 4,991,656 | A | 2/1991 | Polan |
| 6,209,654 | B1 | 4/2001 | Curless |
| 2002/0134557 | A1 | 9/2002 | Petersen |
| 2003/0000712 | A1 | 1/2003 | Franson |
| 2010/0212919 | A1 | 8/2010 | Fischer |
| 2013/0319696 | A1 | 12/2013 | Polan |
| 2014/0158381 | A1 | 6/2014 | Orr et al. |

* cited by examiner

PRIOR ART

NOZZLE PLUGS FOR A DELUGE FIRE PROTECTION SYSTEM

CROSS REFERENCES

This application is a U.S. National Phase Application of International Application No. PCT/US2021/046837 filed on Aug. 20, 2021, which claims priority to U.S. Provisional Application No. 63/068,574 filed on Aug. 21, 2020, the disclosures of are incorporated by reference herein.

FIELD

The present disclosure relates generally to the protection and maintenance of nozzles for fire protection systems and, more particularly, to protective plugs for deluge nozzles.

BACKGROUND

This section provides background information related to the present disclosure which is not necessarily prior art.

Fire protection sprinkler systems are commonly used for suppressing fires with water upon detecting heat or smoke. These systems typically include a water source such as a source of city water, one or more sprinklers such as fusible sprinkler heads that are activated by heat, and a piping network interconnecting the water source and sprinkler heads.

Various types of water based sprinkler systems are known, such as wet pipe sprinkler systems and dry pipe sprinkler systems, which are closed systems, and deluge fire sprinkler systems, which are open systems.

It has been found that the presence of oxygen in these systems fuels an aggressive corrosion reaction, as discussed, for example in U.S. Pat. Nos. 9,144,700 and 9,186,533, the entire disclosures of each of which are expressly incorporated by reference herein. In the case of closed systems, including wet pipe and dry pipe systems, it is possible to “inert” the systems by means of introducing pressurized nitrogen gas into the closed pipe networks in order to absorb oxygen and water vapor and venting the resulting gas mixture from the pipe network through vents that are configured to maintain an above atmospheric pressure within the pipe network. Various devices and methods to effectuate these inerting processes are disclosed in the ’700 and ’533 patents.

However, deluge fire protection systems, which, again, are open systems, present a unique challenge for these inerting processes. Deluge fire sprinkler systems are similar to pre-action systems in the sense that they are solely activated by the detection of a fire hazard, not just heat alone. This detection and subsequent activation of the deluge fire sprinkler system can be automatic (i.e., smoke detection) or manual (human activation). Under normal operation, a deluge fire protection system is “dry” and does not contain or flow any water until a hazard is detected. A significant difference between a deluge fire sprinkler system and, for example, a pre-action fire sprinkler system is that the sprinkler heads or nozzles in a deluge system are open to atmosphere and do not contain any mechanism that allows the system to maintain a system pressure above atmospheric pressure, with either water or gas. As a result, water flows to and out of all nozzles connected to an activated sprinkler zone in the system. This contrasts with a other fire protection sprinkler systems—in which each sprinkler head is provided with a fusible ampule that closes off the exit orifice of the sprinkler head—wherein water flows only from those sprinkler heads whose fusible ampule has been melted from heat, resulting in release of the associated plug. Deluge fire protection systems are mainly used in high-hazard applications that require the application of water over a large area, such as aircraft hangars or automotive-transporting marine applications.

As with closed fire protection sprinkler systems, corrosion is a significant issue in deluge fire protection systems. In fact, because corrosion in fire sprinkler systems is in significant part caused by oxidative chemical reactions, deluge systems create an ideal environment for these chemical reactions to take place. Trapped water migrates to the low points of the fire protection system, and there is no way to remove it without a draining mechanism. The open nozzles of a deluge system supply the pipe networks of the systems with a continuous flow of atmospheric oxygen, which acts as an infinite fuel source for the corrosion reaction. In turn, as this reaction persists, the buildup of corrosion byproducts (mainly iron oxide) can subsequently leads to plugging of sprinkler nozzles upon system activation that prevents any flow or an optimal flow of water from the sprinkler nozzle. This can create high-risk situations in which the sprinkler system cannot be trusted to extinguish potential fires that may occur.

More particularly, there are two significant problems that result from the continuous oxygen corrosion that occurs within a deluge piping network. First, the by-product of the oxygen corrosion reaction with steel or galvanized steel is solid, insoluble debris. In the case of steel pipe, the by-product is iron oxide. In the case of galvanized steel pipe, the by-product is zinc hydroxide and zinc oxide. All of these insoluble materials can accumulate within the piping and cause plugging risks when water is delivered to the deluge nozzles. Second, the continuous action of oxygen on the metal surfaces of the pipe network results in the creation of pitting (or voids) in the metal surface where the metal is removed. Over time this process removes enough metal from the pipe wall to cause a breach, leading to leaking or outright pipe failure.

As noted above, there are methods available to inert fire protection systems with nitrogen or another inert gas. However, in order to implement these methods, which require introduction of a higher-than-atmospheric pressure in the pipe network of the systems, there must be a means to hold and maintain an amount of inert gas pressure while the system remains unactuated. While devices intended to plug deluge nozzles are used in some situations, as shown, for example, in FIG. 1, these plugs are designed only to keep contaminants out of the system. They are unable to maintain any suitable pressure levels within the deluge pipe network in order to allow the system to be inerted. Further, temperature variations, and resulting expansion and contraction of the plugs can result in the plugs coming unseated from the orifice of the nozzle.

Therefore, there is a need for a different way to seal the orifices of deluge nozzles to prevent or minimize the deleterious effects of oxygen generated corrosion

SUMMARY

This section provides a general summary of the disclosure and is not a comprehensive disclosure of its full scope or all of its features.

According to one aspect of the present disclosure, there is provided a nozzle plug for a deluge fire protection system having nozzles connected with a pipe network, the nozzles having a pipe connection with a nozzle chamber and a nozzle orifice allowing for the flow of water toward a deflector for dispersal, that includes a plug body configured to fit within the nozzle chamber and/or nozzle orifice and form a seal of the nozzle orifice; a deformable component connected with the plug body configured to retain the seal of the nozzle orifice up to a predetermined pressure level above atmospheric pressure within the pipe network and to deform when a current pressure with the pipe network exceeds the predetermined pressure level and release the seal of the nozzle orifice to allow for the flow of water through the nozzle orifice; and wherein the deformable component is configurable to calibrate a deformation point corresponding to the predetermined pressure level.

According to another aspect of the present disclosure, the deformable component includes a thin-walled section of the plug body configured to rupture upon exposure to pressure in excess of the predetermined pressure level.

According to a further aspect of the present disclosure, the deformable component includes a deformable stem connected with an exterior surface of the plug body at a first end and having a second end extending to and making contact with a portion of the deflector extending toward the nozzle orifice.

According to yet another aspect of the present disclosure, the predetermined pressure level is calibrated by adjusting a parameter of the deformable component, for example, a wall thickness of a thin-walled section of the plug or one of a thickness of a deformable stem, a rigidity of a material used for the deformable stem, or a depth of a depression in one end of the deformable stem.

Various aspects of this disclosure may provide benefits such as a redundant power supply to minimize likelihood of operational interruption of vents and resulting corrosion damage to the fire protection sprinkler system, simplified installation and maintenance, eliminating external power source requirements, and minimizing battery replacement requirements.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
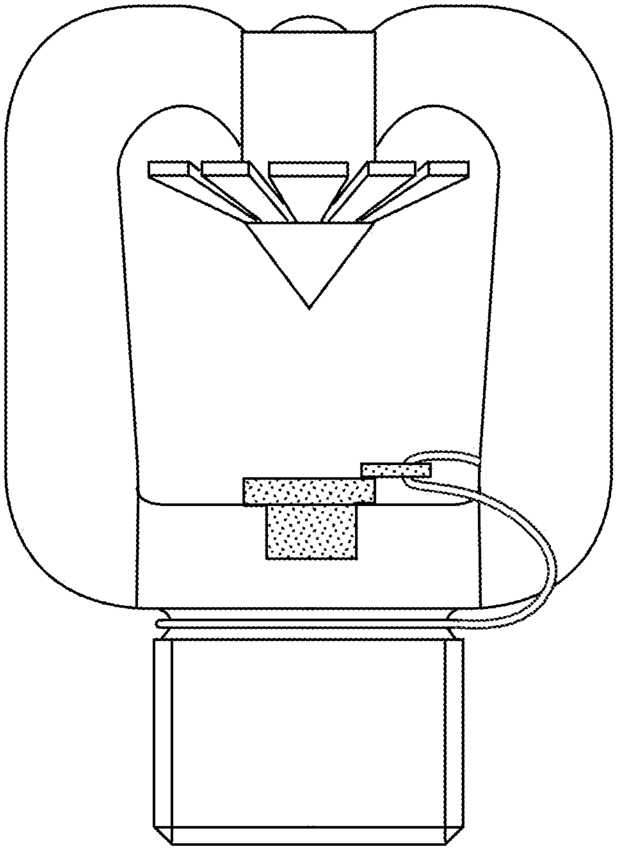
FIG. 1 is a schematic view of a deluge nozzle with a blow-off plug.

Example embodiments will now be described more fully with reference to the accompanying drawings.

Example embodiments are provided so this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The methods, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
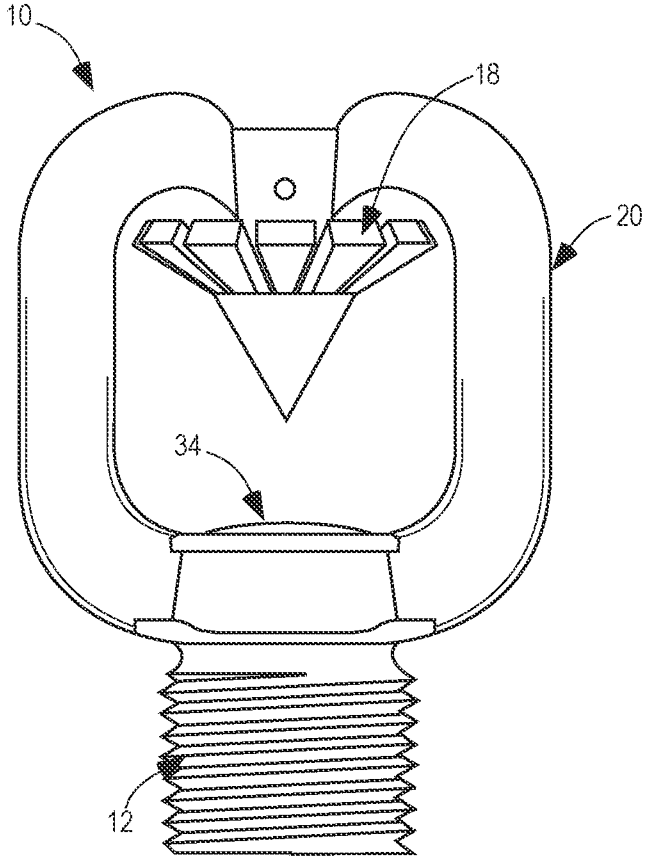
FIG. 2 is a schematic view of a deluge nozzle incorporating an embodiment of a nozzle plug according to an embodiment of the present disclosure.
Figure 2A:
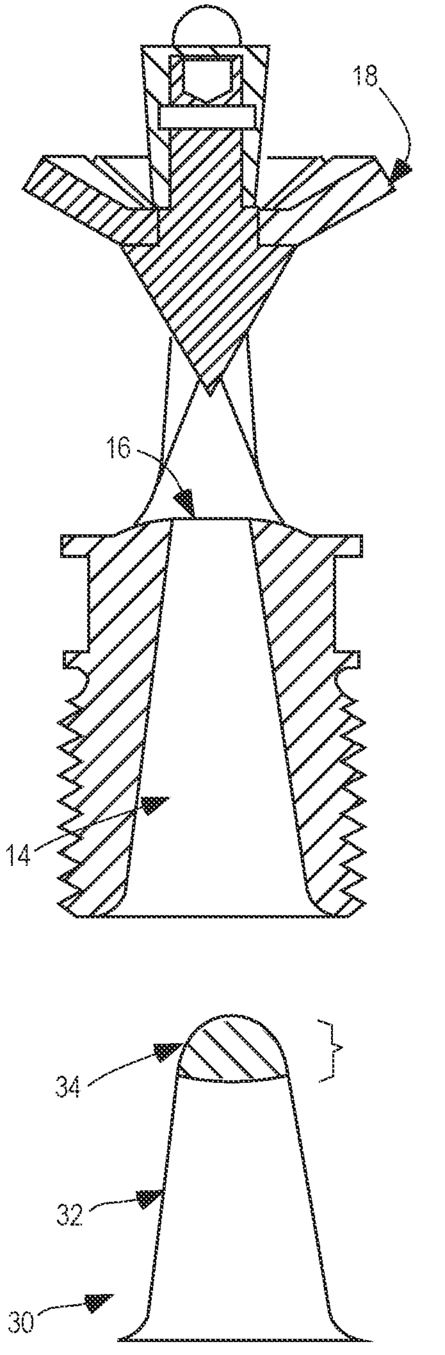
FIG. 2A is a cross-sectional, exploded view of the deluge nozzle and nozzle plug of FIG. 2.
Figure 2B:
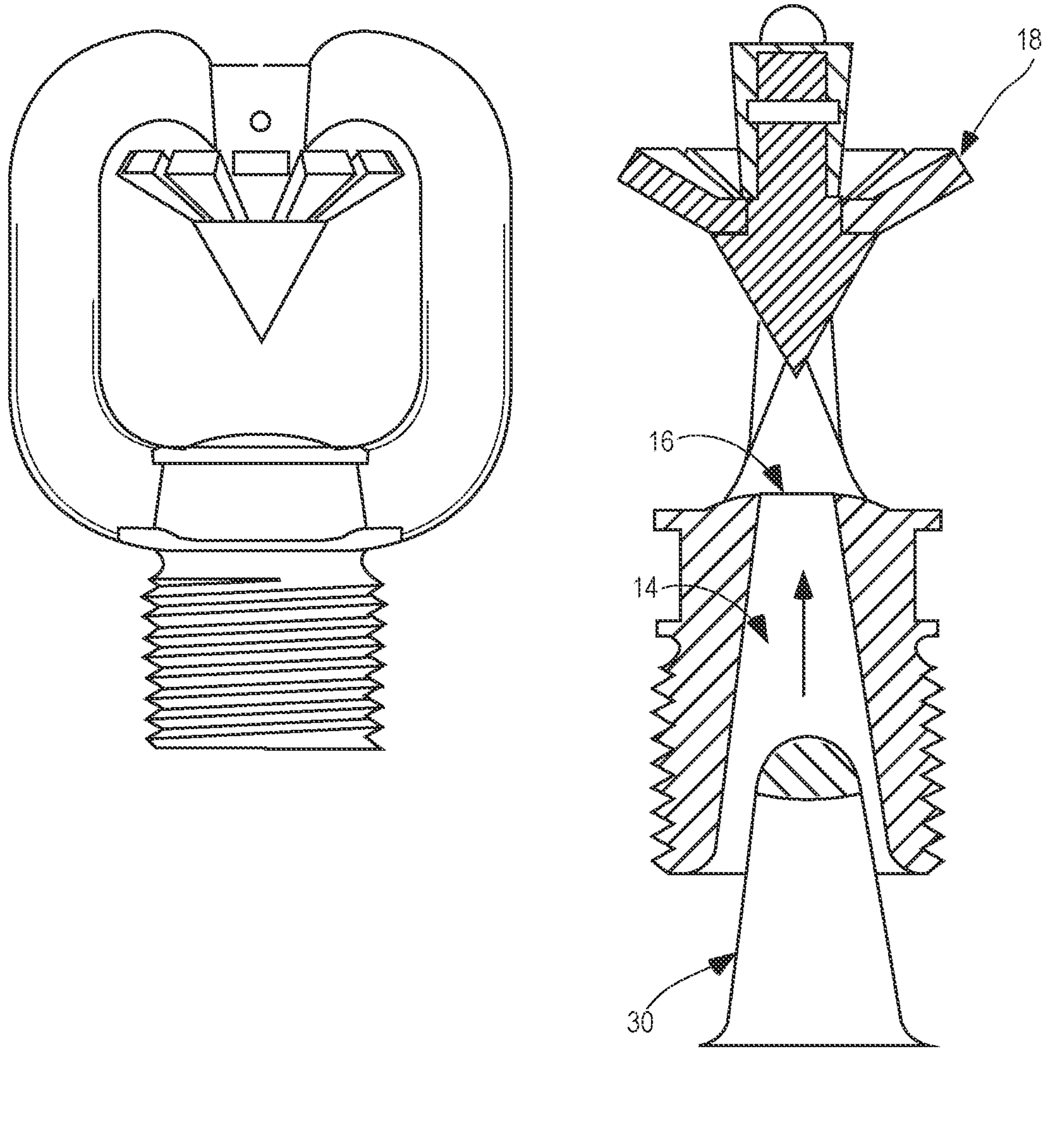
FIG. 2B is a cross-sectional, exploded view of the deluge nozzle and nozzle plug of FIG. 2 as the nozzle plug is inserted into the nozzle chamber.

FIGS. 2-2B of the present disclosure illustrate a first embodiment of a deluge nozzle 10 and nozzle plug 30. The deluge nozzle 10 may include a pipe connection 12, which may be provided with typical means, for example, screw threads, to enable it to be connected with the pipe network of the fire protection system. The pipe connection 12 may further include a nozzle chamber 14 that allows water to pass from the pipe network to a nozzle orifice 16. Water escaping from the nozzle orifice 16 may be dispersed by a deflector 18 that is supported on a frame 20.

The nozzle plug 30 may comprise a plug body 32 and a burst disc 34. The plug body 32 and burst disc 34 may be formed as a single piece or separate pieces that are subsequently joined together. The burst disc 34 may be a thin walled section of material, for example, having a thickness less than that of the plug body 32. This creates a designed rupture point for the nozzle plug 30. In some embodiments, the burst disc 34 may be configured with a diameter that roughly matches the diameter of the nozzle chamber, such that upon rupturing the nozzle plug 30 develops an opening of approximately the same size as the nozzle chamber 14 to minimize obstruction of the nozzle chamber 14. Alternately, the burst disc 34 may be arranged to separate or breakaway where the burst disc 34 meets the plug body 32. In some of those alternate embodiments, the burst disc 34 may have a diameter that is approximately equal to or less than a diameter of the nozzle orifice 16 to facilitate passing of the burst disc 34 out of the nozzle orifice 34 following separation from the plug body 32. The burst disc 34 functions to seal the nozzle orifice 16 prior to actuation of the system. As shown in FIG. 2, the burst disc 34 may extend to some degree through the nozzle orifice 16 due to its size or by being provided with a domed structure to enhance the seal of the nozzle orifice 16.

Rupture, or separation, of the burst disc 34 from the plug body 32 may be configured to occur when the pressure within the pipe network exceeds a predetermined threshold. The structure, in particularly, the wall thickness of the burst disc 34, or the relative wall thicknesses of the burst disc 34 and plug body 32, may be adjusted to calibrate the nozzle plug 30 to rupture or separate at a particular pressure. In embodiments configured to allow for separation rather than rupture of the burst disc 34, a tear line, formed by introducing a designed weakness in the material, may be also be added to the nozzle plug 30 at the intersection of the plug body 32 and burst disc 34 to further calibrate the separation pressure threshold of the nozzle plug 30.

In the embodiment of FIGS. 2-2B, the nozzle plug 30 and, more particularly, the plug body 32, may be provided with a tapered shape to correspond with a taper of the nozzle chamber 14. The nozzle plug 30 may be inserted into the nozzle chamber 14 prior to installation of the nozzle 10, as illustrated in FIG. 2B, and press fit in the nozzle chamber 14 to be secured in place. However, alternate methods of securing the nozzle plug 30 in place are contemplated within the scope of the present disclosure.

Figure 3:
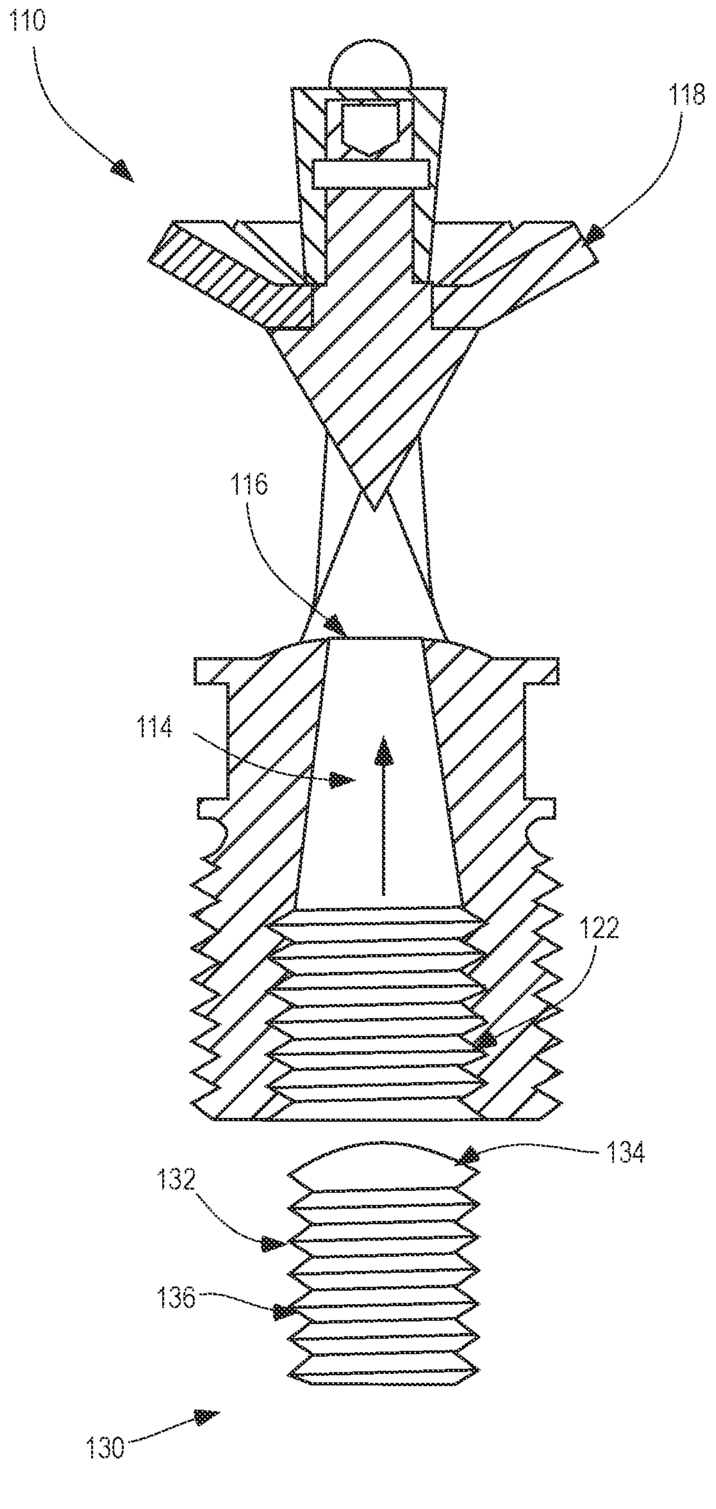
FIG. 3 is a cross-sectional, exploded view of a deluge nozzle incorporating an embodiment of a nozzle plug according to another embodiment of the present disclosure.

FIG. 3 illustrates another embodiment in which a nozzle plug 130 may be secured within a deluge nozzle 110 by a threaded relationship. In this embodiment, the nozzle 110 may be provided with a pipe connection 112 the further includes a section having internal screw threads 122 at the end opposite the nozzle orifice 116. As with other embodiments, the nozzle 110 may be further provided with a nozzle chamber 113, deflector 118, and frame 120, which operate in the same manner. The nozzle 110 may have a plug body 132 that includes screw threads 136 on its exterior surface. The screw threads 136 of the plug body 132 may be configured to match the screw threads 122 of the nozzle pipe connection 112 such that screwing the nozzle plug 130 into the pipe connection 112 secures the plug body 132 within the nozzle 110.

The nozzle plug 130 may again incorporate a plug body 132 and a burst disc 134 provided with a similar relationship as previously described with other embodiments. More particularly, the burst disc 134 is configured to rupture or separate from the plug body 132 upon introduction of a pressure level equal to or in excess of a predetermined pressure threshold. The rupture or separation threshold of the nozzle plug 130 may be calibrated by adjusting the wall thickness of the burst disc 134 or the relative wall thicknesses of the burst disc 134 and/or the plug body 132, by providing a tear line at the intersection of the burst disc 134 and plug body 132, or other structures. The burst disc 134 may again be sized or configured with a shape, for example, a slight dome, to enhance sealing of the nozzle orifice 116.

In operation, a new nozzle plug 30, 130 may be inserted into the nozzle chamber 14, 114 of each deluge nozzle 10. 110 of the fire protection system during installation, after testing of the system, or after actual actuation of the system. The nozzle plug 30, 130 effectively seals the nozzle orifice 116 up to a predetermined pressure threshold, thereby allowing the pipe network to hold a desired pressure level, for example, approximately 7 psig, which enables use of the nitrogen inerting methods referenced herein. The nitrogen pressure used for inerting the pipe system may be kept around or less than 5 psig while maintaining effectiveness of the inerting process. Other pressure thresholds, for example, ranging from 5-10 psig, may be utilized depending on the operating parameters of the system. For example, the pressure threshold for the nozzle plug 30, 130 may be equal to or slightly less than the expected operating parameters and pressure within the pipe network when the system is activated and water is released into the pipe network for delivery to the deluge nozzles 10, 110.

Appropriate configuration of the nozzle plug, more particularly for example, the wall thickness of the burst disc 34, 134, may ensure timely and rupture/separation of the burst disc 34, 134 to allow for unimpeded flow of water from the pipe system to the nozzle 10, 110 and through the orifice 16, 116. Further, the arrangement of the nozzle plug 30, 130 may further facilitate removal of the spent nozzle plug 30, 130 after activation of the system. The nozzle plug 30, 130 may be constructed of a suitable material, for example, aluminum, brass, or copper, although other materials may be used as appropriate while incorporating the structures described in the present disclosure.

Upon activation of the fire protection system, the pressure within the pipe network increases to and beyond the pressure threshold of the nozzle plug 30, at which point, the burst disc 34 ruptures or completely separates from the plug body 32 in a designed failure mode. If the burst disc 34 separates form the plug body 32, it may pass through and out of the nozzle orifice 16. In either case of separation or rupture, the seal of the nozzle orifice 16 is broken, allowing water to pass through the orifice 16 for dispersal around the protected area. Once the fire event is concluded, the expended nozzle plug 30 may be removed from the nozzle 10 and a new nozzle plug 30 inserted into each deluge nozzle 10 to reset the system for re-inerting. Alternately, if desired, an entire new nozzle 10 and nozzle plug 30 may be used. It is contemplated as another possible alternative that the nozzle plug or simply the burst disc may be incorporated directly into the design of the deluge nozzle, which may facilitate installation of the nozzle but would increase the overall costs associated with system maintenance.

Figure 4:
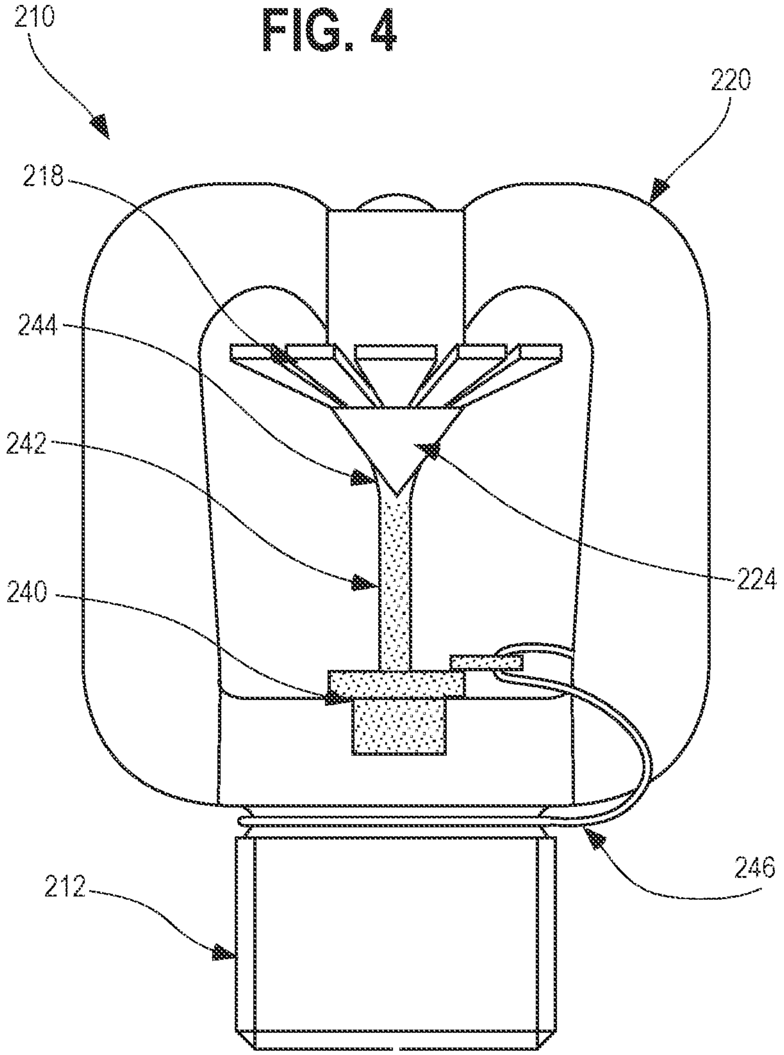
FIG. 4 is a schematic view of a deluge nozzle incorporation another embodiment of a nozzle plug according to the present disclosure.
Figure 4A:
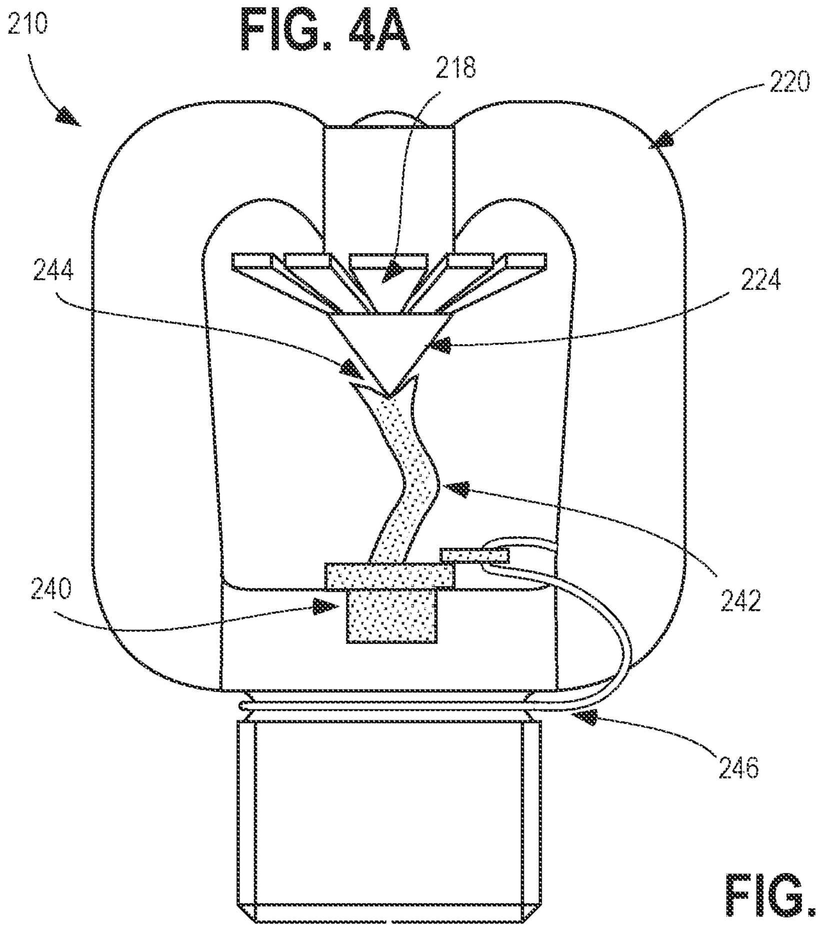
FIG. 4A is a schematic view of the nozzle plug of FIG. 4 showing the plug in an intermediate stage of deformation.
Figure 4B:
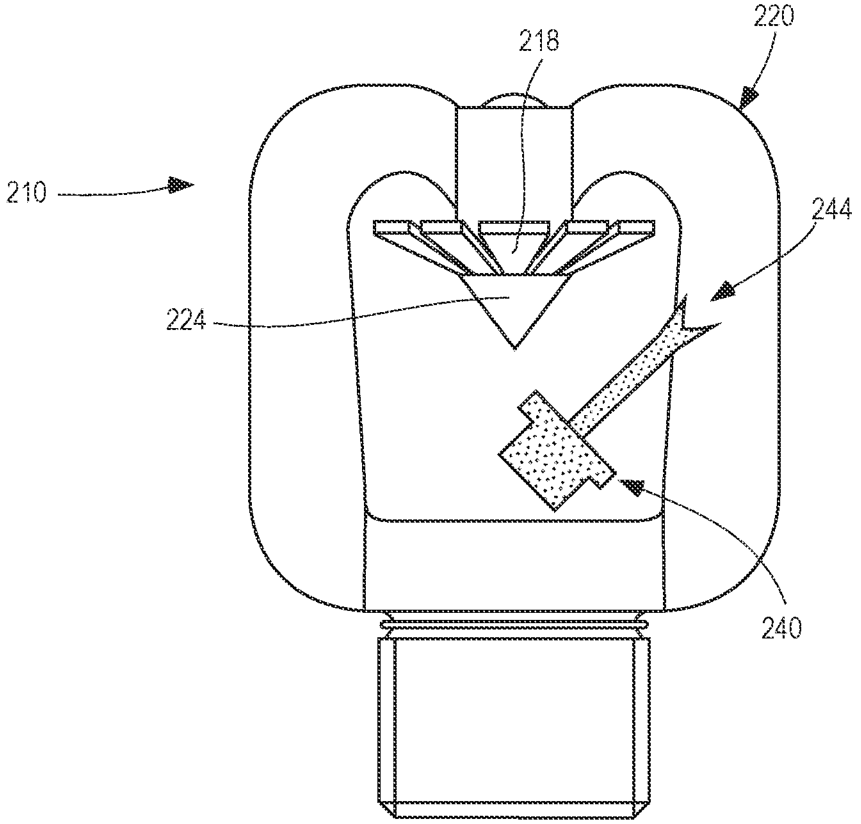
FIG. 4B is a schematic view of the nozzle plug of FIG. 4 as it is ejected from the orifice of the deluge nozzle.

FIGS. 4-4B illustrate yet another embodiment of a nozzle plug 240 according to the present disclosure. In this embodiment, the nozzle plug 240 is inserted into the nozzle orifice 216 from the exterior side of the deluge nozzle 210 rather than the interior. As before, the nozzle 210 also includes a pipe connection 212 with screw threads 222, nozzle chamber (not shown), deflector 218, and frame 220. The nozzle 210 may further include a splitter point 224 that initiates dispersal of the stream of water emerging from the nozzle orifice 216. The nozzles 10, 110 referenced in connection with other embodiments may also include splitter points, however, those embodiments do not make use of the splitter points. The splitter point 224 may be provided with, as its name suggests, a point at the tip of a cone which leads to the deflector 218. The splitter point 224 is oriented toward the nozzle orifice 216.

The nozzle plug 240 includes stem 242 that extends from the nozzle plug 240 to the splitter point 224. More particularly, the stem 242 may be provided with a length that generally corresponds to or is slightly greater than a distance between the exterior surface of the nozzle plug 240 and the splitter point 224. The stem 242 may be integrally formed with the nozzle plug 240 or formed as a separate piece and subsequently joined with the main body of the nozzle plug 240. The stem 242 may be provided with a depression or cup 244 at its end adjacent the splitter point 224. The cup 244 provides a seat for the splitter point 224 in the end of the stem 242. In other embodiments suitable for use with nozzles that do not have splitter points, the depression may be omitted, and the stem may engage a different portion of the deflector.

During installation of the nozzle plug 240, the main body of the plug 240 is inserted into the nozzle orifice 216 to seal the orifice 216. The stem 242 may then be pushed into position with its far end in contact with the splitter point 224. The stem cup 244 may be positioned to seat the splitter point 224 to secure the stem—the nozzle plug 240—in place. This configuration allows for the nozzle plug 240 to remain seated in the nozzle orifice 216 when higher than atmospheric pressure is introduced into the pipe system. As with the other embodiments described in the present disclosure, this allows for the introduction of pressurized nitrogen into the pipe network for inerting of the system.

In this embodiment, the mechanism of designed failure of the nozzle plug centers on the stem 242. The stem 242 may be configured to deform in response to a predetermined pressure threshold within the pipe network as shown progressively in FIGS. 4A and 4B. Sufficient deformation of the stem 242 may prevent it from retaining the nozzle plug 240 in position with the nozzle orifice 216. As a result, the increased pressure within the pipe network experienced during system activation ejects the nozzle plug 216 to allow for the flow of water through the nozzle orifice 216.

The nozzle plug 240 and stem 242 may be formed from a resiliently deformable material, for example EPDM, which is commonly utilized for prior art plugs. The deformation or ejection threshold of the nozzle plug 240 may be calibrated by adjusting the stem design or thickness, the rigidity or stiffness of the material used to form, in particular, the stem 242, and/or the cup 244 profile (e.g., its depth).

The use of a resiliently deformable material for at least the stem 242 may provide an advantage in that the nozzle plug 240 may be reusable because it is ejected with damage to its structure as the material is able to deform and return to its original shape. The reusable nature of the nozzle plug 240 may be further facilitated by incorporation of a retaining wire 246 that keeps the nozzle plug 240 connected with the nozzle 210 after ejection.

The stem 242, if constructed as an individual component, may be added to current blow-off plugs, which, as noted above, are, in their standard state, incapable of maintaining any pressure within the pipe network. Such a configuration would allow for unchanged manufacture of the main body of the improved nozzle plug 240 or minimal modification to those structures. In appropriate cases, this configuration may allow for the retrofitting of standard blow-off plugs in existing systems without replacing those plugs. In addition, this embodiment allows for the use of standard nozzles without any modification.

The structure and operation of embodiments of nozzle plugs according to the present disclosure address the problems described herein. In particular, these embodiments allow for the maintenance of a sufficient pressure within the pipe network of a deluge fire protection system to facilitate nitrogen inerting of the system to minimize or prevent corrosion of the system pipe network, while not interfering in the normal activation and operation of the system. Certainly, these embodiments also serve the function of preventing contaminants from entering the nozzles prior to system activation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A nozzle plug for a deluge fire protection system having multiple nozzles connected with a pipe network, each nozzle having a nozzle chamber and a nozzle orifice allowing water from the pipe network to pass through the nozzle and a deflector to disperse the water flowing from the nozzle orifice, the nozzle plug comprising:

a sealing section configured to fit within the nozzle chamber and/or nozzle orifice and form a seal of the nozzle orifice;

a deformable section connected with the sealing section and configured to:

retain the sealing section within the nozzle chamber and/or nozzle orifice to maintain the seal of the nozzle orifice up to a predetermined pressure level above atmospheric pressure within the pipe network; and deform when a current pressure within the pipe network exceeds the predetermined pressure level to allow the current pressure within the pipe network to displace the sealing section from the nozzle chamber and/or nozzle orifice and release the seal of the nozzle orifice to allow the water within the pipe network to pass through the nozzle orifice;

wherein the deformable section is configurable to calibrate a deformation point corresponding to the predetermined pressure level; and wherein the deformable section comprises one of:

a wall having a first thickness, wherein the sealing section is provided with a second thickness and wherein the first thickness is less than the second thickness, or a deformable stem connected with the sealing section at a first end of the deformable stem and having a second end extending to and engaging a portion of the deflector extending toward the nozzle orifice and wherein the deformable stem comprises a resiliently deformable material.

2. The nozzle plug for a deluge fire protection system as set forth in claim 1, wherein the wall of the deformable section is configured to rupture upon exposure to the current pressure within the pipe network exceeding the predetermined pressure level.

3. The nozzle plug for a deluge fire protection system as set forth in claim 1, wherein the wall of the deformable section is configured to separate from the sealing section upon exposure to the current pressure within the pipe network exceeding the predetermined pressure level.

4. The nozzle plug for a deluge fire protection system as set forth in claim 1, wherein the nozzle plug is press fit into the nozzle chamber.

5. The nozzle plug for a deluge fire protection system as set forth in claim 1, wherein an exterior surface of the nozzle plug further comprises male screw threads; and wherein the nozzle plug is configured to be screwed into the nozzle chamber.

6. The nozzle plug for a deluge fire protection system as set forth in claim 1, wherein the second end of the deformable stem further comprises a depression configured to engage a splitter point of the deflector.

7. The nozzle plug for a deluge fire protection system as set forth in claim 6, wherein the predetermined pressure level is calibrated by adjusting one of a thickness of the deformable stem, a rigidity of the deformable stem, and a depth of the depression.

8. The nozzle plug for a deluge fire protection system as set forth in claim 1, wherein the predetermined pressure level is calibrated by adjusting the first thickness of the wall of the deformable section.

9. The nozzle plug for a deluge fire protection system as set forth in claim 1, wherein the predetermined pressure level is calibrated by adjusting one of a thickness of the deformable stem and a rigidity of the deformable stem.

* * * * *